Sept. 6, 1927.
R. L. WALLACE
1,641,463
MEANS TO PREVENT REVERSE ROTATION OF ROTARY MEMBERS
Filed April 21, 1926
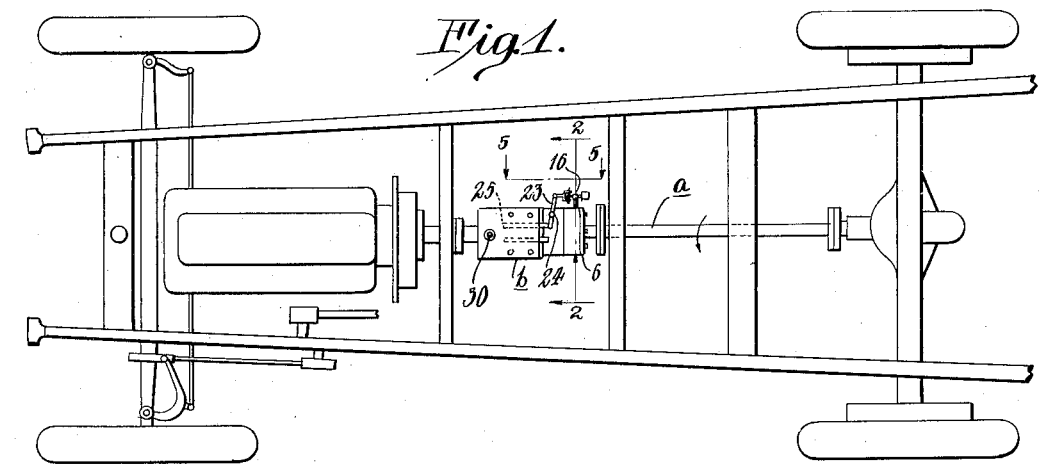
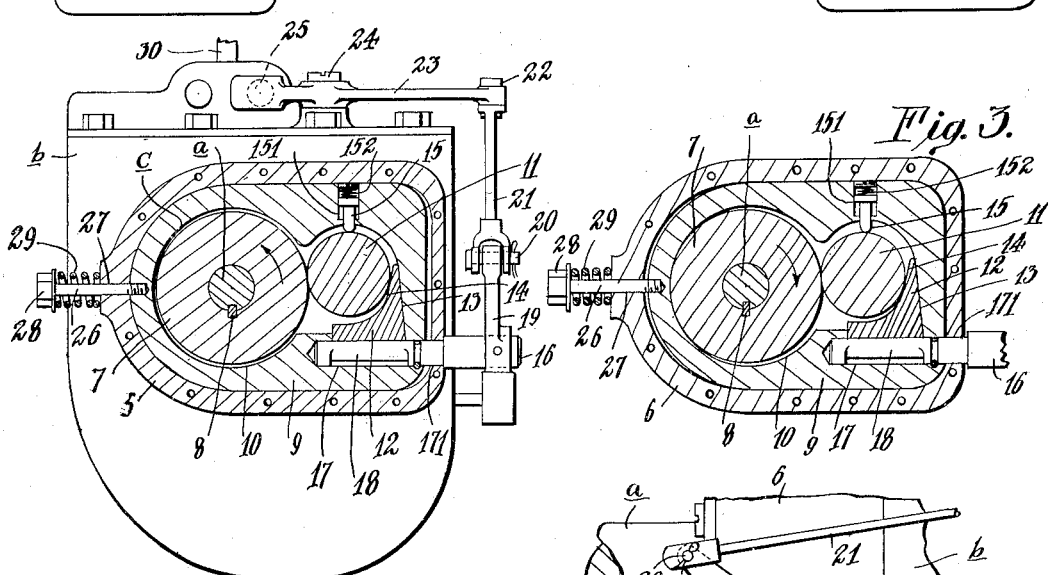
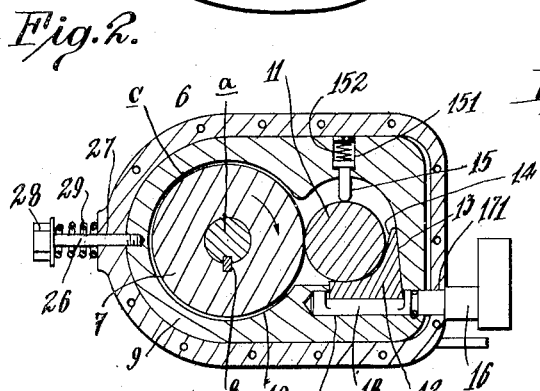
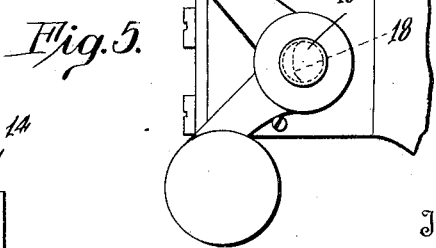
Inventor
Robert Lee Wallace
By Lyon & Lyon
Attorneys Patented Sept. 6, 1927.

1,641,463

UNITED STATES PATENT OFFICE

ROBERT LEE WALLACE, OF LOS ANGELES, CALIFORNIA.

MEANS TO PREVENT REVERSE ROTATION OF ROTARY MEMBERS.

Application filed April 21, 1926. Serial No. 103,517.

This invention relates to means to prevent reverse rotation of a rotary member and is useful to hold a rotary part, for example the drive shaft of an automobile, against reverse rotation so that the automobile, when on a grade, will be prevented from rolling backward down the grade in event of the driving power failing and the brakes being off or ineffectual to prevent such backward rolling.

In a device of this character, it is essential to provide for retraction of the holding means, at will, when it is desired to put the transmission in reverse to effect backing of the automobile.

This invention is an improvement on the device patented to Horatio G. Coykendall, November 18, 1924, No. 1,516,081. An object that distinguishes this invention from the above mentioned patent is to make provision for preventing deflection of the shaft when a fixed housing is employed.

A further object is to make provision for engaging the rotary member, that is to be held against reverse rotation, on opposite sides.

Further objects and advantages will appear in the subjoined detailed description.

The accompanying drawings illustrate the invention.

Figure 1 is a plan view of a means embodying the invention, the same being shown in operative position on the chassis of an automobile.

Figure 2 is an enlarged sectional elevation on the line indicated by 2—2, Fig. 1, the operating parts being in the positions they occupy when the rotary member is turning in the direction for driving the automobile forward and the dog has been operated to position to prevent reverse rotation of said rotary member.

Figure 3 is a sectional elevation similar to Fig. 2, omitting the cam operating mechanism, but the operating parts being in the positions they occupy upon reverse rotation of the rotary member.

Figure 4 is a sectional elevation similar to Fig. 3, but showing the operating parts in the positions they occupy when the dog is released.

Figure 5 is an enlarged fragmental elevation from the line indicated by 5—5, Fig. 1.

The construction that is to be described is such that it is of advantage to use with an automobile in case the propeller shaft is not enclosed in a housing. Such a propeller shaft is indicated at $a$ in Fig. 1 and constitutes a portion of the rotary member which is to be held against reverse rotation. The transmission case of the automobile is indicated at $b$ and serves as an anchorage upon which the invention is mounted. The shaft $a$ passes through a housing 6 and the shaft $a$, being of relatively small diameter, is enlarged by a collar 7 which constitutes a part of the rotary member and is fixed to the shaft by a key 8 or any other suitable means. Inside of the housing 6 is a floating member 9 provided with a chamber 10 in which is movably mounted a dog 11 that engages the rotary member 7, said dog, in this instance, being in the form of a roller, a type frequently employed in preventing reverse rotation of a rotary member.

A movable member 12 is provided within the chamber 10 to support the dog 11 in engagement with the rotary member $a$, said member 12 being releasable so that, when it is desired that reverse rotation of the rotary member occur, the support for the dog 11 will be lowered to permit the dog to drop.

The member 12 is preferably a wedge shape block, having its wider end pointing downwardly. The outer face of the block 12 preferably bears against the upwardly and inwardly slanting face 13 of the wall of the chamber 10 so that, if the block 12 is moved upwardly, said block is wedged toward the rotary member $a$, as in Fig. 2, thus narrowing the space in which the dog 11 is positioned. This forces the dog 11 inwardly toward the rotary member, which then is free to rotate forward in the direction of the arrow in Fig. 2, but which at that time cannot turn in a reverse direction.

The wedging effect of the block 12 upon the dog 11 is secured in two ways, for, not only is the face 13 aslant upwardly and inwardly but the inner face 14 of the block 12 is aslant upwardly and outwardly. The lower portion of the face 14 extends beneath the dog for the dog to rest on in its retracted position, as shown in Fig. 4. In the elevated position shown in Figs. 2 and 3, the dog 11 has a three-point bearing as it bears against one side of the rotary member 7, against the upper portion of the face 14, and against a yieldingly held member 15, shiftably mounted in a chamber 151 in the member 9. A spring 152 in the chamber 151 above the member 15 yieldingly holds the member 15, which is in the form of a plunger, against the dog 11, thus tending to move the dog 11 into the retracted position shown in Fig. 4.

Any suitable means may be provided for operating the block 12 from the lowered position in Fig. 4 to the elevated position in Fig. 2, and such means comprises, in this instance, a cam shaft 16 inserted in a bearing 17 in the member 9, said shaft extending across the lower portion of the chamber 10 and passing through an opening 171 in the housing 6. The shaft 16 is provided with a cam 18 on that portion that extends across the lower part of the chamber 10 so that, when the shaft 16 is turned to the position shown in Fig. 2, the high point of the cam will bear against the lower end of the block 12 and hold said block in its elevated position. When the shaft 16 is turned to the position shown in Fig. 4, the low point of the cam is uppermost, thus permitting the block 12 to be pushed downwardly by the roller 11, which in turn is positively retracted by expansion of the spring 152. The cam 18, in this instance, is merely an eccentric, and the shaft 16 is turned by an arm 19, that in turn is pivoted at 20 to one end of a link 21, the other end of which is pivoted at 22 to a lever 23. The lever 23 is pivotally mounted at 24 on the transmission case b. One arm of the lever 23 lies in the path of movement of one of the gear shift rods, indicated at 25 in Fig. 1, said rod being the one that controls the low speed forward and reverse positions of the transmission gears, not shown. The construction of change speed mechanism is well understood by those skilled in the automotive art and, therefore, it suffices to state that when the gear shift lever is moved into reverse position it thrusts the rod 25 rearwardly, thus actuating the lever 23, which in turn causes the cam 18 to assume the position shown in Fig. 4, permitting retraction of the dog 11.

It will be noted that the floating member 9 is slightly shorter than the space inside of the housing 6 so as to permit of motion of the member 9 transversely of the axis of the rotary member 7. That portion of the chamber 10 in which is positioned the rotary member 7 is slightly larger in diameter than the member 7 so that, when the member 9 is in the retracted position shown in Figs. 2 and 4, there will be a slight clearance c between the members 7, 9. Means are provided to yieldingly hold the member 9 in this retracted position, said means comprising, in this instance, a stud 26 projecting from one end of the member 9 through an opening 27 in the housing 6. The outer end of the stud 26 is provided with a shoulder 28, and between said shoulder and the housing 6 and surrounding said stud is a coil spring 29, the expansive force of which tends to force the stud 26 outwardly. The height of the member 9 is substantially the same as the interior space of the housing 6 so that the member 9 will slidably fit in the housing.

The operation of the invention is as follows: Assuming that the automobile is traveling forward up a grade and that the propeller shaft a is rotating in the direction of the arrow in Figs. 1 and 2, the cam 18 and other operating parts will be in the positions shown in Fig. 2, thus permitting free rotation of the propeller shaft in the direction of the arrow. Let it now be assumed that for some reason or other the automobile comes to a stop on the grade and begins to back down the grade, thus reversing the rotation of the propeller shaft, causing said shaft to rotate in the direction of the arrow in Fig. 3, thereby cramping the dog 11 between the block 12 and member 7. The reaction upon the member 7 would tend to deflect said member 7 and shaft a to the left in Fig. 3, if they were not held against deflection, but the thrust of the block 12 is not only against the dog 11 but is also against the face 13 of the member 9, thus causing the member 9 to slide to the right from the position shown in Fig. 2 to a position in which the member 9 engages that side of the member 7 that is substantially diametrically opposite to that side of said member 7 that is engaged by the dog 11, as in Fig. 3. Thus the member 7 will be gripped on opposite sides and the gripping means are self-centering so as to avoid deflecting the shaft either to the right or left. This gripping of the member 7 prevents reverse rotation of the propeller shaft but at any time the propeller shaft is free to turn forward in the direction of the arrow in Fig. 2 as soon as power is applied to thus turn said shaft and, when such power is applied, the grip of the dog 11 on the member 7 is relieved, thus permitting the spring 29 to retract the member 9 to the position shown in Fig. 2.

Assuming, for example, that the operating parts are in the positions shown either in Fig. 2 or Fig. 3, and that it is desired to permit the automobile to back down the grade or, if the car is on a level, to permit the automobile to be driven rearwardly by application of the power of the engine, the gear shift lever, indicated at 30, will be operated to put the transmission gears in reverse, thus shifting the rod 25 rearwardly to operate the lever 23 to rotate the cam 18 into the position shown in Fig. 4, and so permitting retraction of the dog 11 in order that the member 7 will be free to rotate in the direction of the arrow in Fig. 4.

I claim:

1. A means of the character described comprising a chambered member, a rotary member extending through the chamber, a dog in the chamber to engage the rotary member, means in the chamber wedgeable between the dog and one side of the chamber to move the chambered member into position to engage the opposite side of said chamber with the rotary member, and means yieldingly resisting movement of said chambered member to said position.

2. A means of the character described comprising a housing, a chambered member shiftably mounted in the housing, a rotary member extending through the chamber, a dog in the chamber to engage the rotary member, means in the chamber wedgeable between the dog and one side of the chamber to move the chambered member into position to engage the opposite side of said chamber with the rotary member, and means anchoring the housing.

3. A means of the character described comprising a chambered member, a rotary member extending through the chamber, a dog in the chamber to engage the rotary member, means in the chamber wedgeable between the dog and one side of the chamber to hold the dog toward the rotary member, means yieldingly holding the dog toward the last mentioned means, and means to hold the chambered member against rotation and permitting of shifting of the chamber when the wedging means react against the chamber.

4. A means of the character described comprising a housing, a chambered member shiftably mounted in the housing, a rotary member extending through the chamber and projecting outside of the housing, a dog in the chamber to engage the rotary member, means in the chamber wedgeable between the dog and one side of the chamber to move the chambered member into position to engage the opposite side of said chamber with the rotary member, means yieldingly resisting movement of said chambered member to said position, and means anchoring the housing.

5. A means of the character described comprising a rotary member, a chambered shiftably mounted member extending on opposite sides of the rotary member, a dog in the chamber between the rotary member and one side of the chamber, manually operated means wedgeable between the dog and said side of the chamber, and means yieldingly resisting shifting of the chambered member in the direction that it is caused to shift by the wedging action of the first mentioned means.

Signed at Los Angeles, California, this 12 day of April, 1926.

ROBERT LEE WALLACE.